(12) United States Patent
Abe

(10) Patent No.: US 6,938,641 B2
(45) Date of Patent: Sep. 6, 2005

(54) CHECK VALVE

(75) Inventor: Koichi Abe, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 161 days.

(21) Appl. No.: 10/385,540

(22) Filed: Mar. 12, 2003

(65) Prior Publication Data
US 2003/0172973 A1 Sep. 18, 2003

(30) Foreign Application Priority Data
Mar. 12, 2002 (JP) ........................................ 2002-067227

(51) Int. Cl.⁷ ............................................. F16K 15/02
(52) U.S. Cl. ..................... 137/515.5; 137/538; 251/337
(58) Field of Search ............................. 137/515.5, 538, 137/540; 251/337

(56) References Cited
U.S. PATENT DOCUMENTS

| | | | | |
|---|---|---|---|---|
| 1,101,920 A | * | 6/1914 | Garbutt | 137/538 |
| 1,814,549 A | * | 7/1931 | Fortune | 137/515.5 |
| 2,810,397 A | * | 10/1957 | Olson et al. | 251/337 |
| 3,695,577 A | * | 10/1972 | Jespersen | 251/337 |
| 4,195,656 A | * | 4/1980 | Kanerva et al. | 137/540 |
| 5,065,790 A | * | 11/1991 | Kornas | 137/538 |

* cited by examiner

Primary Examiner—John Rivell
(74) Attorney, Agent, or Firm—Browdy and Neimark, P.L.L.C.

(57) ABSTRACT

A check valve comprises: a pair of cylindrical body elements (1, 4) through which a fluid passes; a cylindrical valve element (7), which is disposed inside an upstream-side one (4) of the cylindrical body elements (1, 4), constantly subjected to a fluid pressure and biased toward its closed position under the influence of a resilient force exerted by a compression coil spring (10) coated with a tubular element; and, a stopper element (24) disposed in a downstream-side one (4) of the cylindrical body elements (1, 4). The check valve is characterized in that at least one of the cylindrical valve element (7) and the stopper element (24) is provided with a spiral seat portion (11) an axial spiral surface of which is brought into stable surface-contact with the compression coil spring (10) to support the compression coil spring (10) therein.

20 Claims, 3 Drawing Sheets

CHECK VALVE

BACKGROUND OF THE INVENTION

1. Field of the Invention

The present invention relates to a check valve, and more particularly to a check valve provided with a spring seat portion which has its spiral seat surface brought into press-contact with at least one of opposite terminal turns of a compression coil spring to support the compression coil spring.

2. Description of the Related Art

In general, as viewed from FIG. 3, a conventional check valve has a single cylindrical body element 21, slidably and coaxially mounted in an upstream-side portion of which body element 21 is a cylindrical valve element 23. This cylindrical valve element 23 has its inner shoulder portion brought into press-contact with one of opposite open ends of a compression coil spring 22 and is therefore constantly biased leftward to its closed position by a biasing device such as the compression coil spring 22 in a longitudinal direction of the cylindrical body element 21. Fixedly and coaxially mounted in a downstream-side bore portion of the cylindrical body element 21 is an annular stopper element 24 for receiving the other of the opposite open ends of the compression coil spring 22.

In operation, when the cylindrical valve element 23 is subjected to a fluid pressure which is larger than a predetermined value, the cylindrical valve element 23 is forcibly moved rightward by the fluid pressure against the biasing force exerted by the compression coil spring 22, so that a fluid passage of the check valve having been closed by the cylindrical valve element 23 is now opened. An O-ring 25 is fixedly mounted in an annular groove formed in an outer peripheral surface of a head portion of the cylindrical valve element 23 to ensure that the fluid passage of the check valve is fluid-tightly closed by the cylindrical valve element 23 when the fluid pressure is smaller than the predetermined value.

As for the biasing force exerted by the compression coil spring 22, it is desirable to have such biasing force applied evenly to the entire circumferential area of the inner shoulder portion of the cylindrical valve element 23. More specifically, when the biasing force is applied unevenly to the inner shoulder portion of the cylindrical valve element 23, the cylindrical valve element 23 tends to incline inside the cylindrical body element 21. Such inclination of the cylindrical valve element 23 inside the cylindrical body element 21 results in leakage of the fluid inside the cylindrical body element 21 in its closed configuration. In order to prevent such leakage of the fluid in the closed position of the cylindrical valve element 23, it is necessary to have each of the opposite open ends of the compression coil spring 22 formed into a closed-end flat shape extending in a vertical plane perpendicular to the longitudinal direction of the cylindrical body element 21, as viewed in FIG. 3. The thus formed closed-end flat shape of each of the opposite ends of the compression coil spring 22 is capable of being brought into surface-contact with each of the cylindrical valve element 23 and the stopper element 24, and therefore capable of having the biasing force of the compression coil spring 22 evenly applied to the entire circumferential area of the inner shoulder portion of each of the cylindrical valve element 23 and the stopper element 24.

In the art of semiconductor fabrication in which the check valve is used in transferring a cleaning fluid, the compression coil spring 22 serving as a biasing device of the check valve is coated with a tubular element made of fluororesins to improve the compression coil spring 22 in chemical resistance. Due to the presence of such tubular element, in the art of semiconductor fabrication, it is impossible to form each of opposite open ends of the compression coil spring into a closed-end shape.

As is clear from the above description, the compression coil spring 22 tends to obliquely push the cylindrical valve element 23 inside the cylindrical body element 21, which makes it impossible for the head portion of the cylindrical valve element 23 to be uniformly brought into press-contact with the O-ring 25. This results in leakage of the fluid in the area of the O-ring 25 when the check valve is in its closed configuration, and also results in vibrations and issuance of noise of the cylindrical valve element 23 inside the cylindrical body element 21 due to misalignment in longitudinal axis between the cylindrical valve element and the cylindrical body element 21.

SUMMARY OF THE INVENTION

Under such circumstances, the present invention was made. Consequently, it is an object of the present invention to provide a check valve free from any vibration and noise problems inherent in the conventional check valve.

The above object of the present invention is accomplished by providing:

A check valve comprising: a pair of body elements (1, 4) through which a fluid passes; a cylindrical valve element (7), which is disposed inside an upstream-side one (1) of the body elements (1, 4), constantly subjected to a fluid pressure and biased toward its closed position under the influence of a resilient force exerted by a compression coil spring (8) coated with a tubular element; and, a stopper element (24) disposed inside one (4) of the body elements (1, 4), CHARACTERIZED IN THAT: at least one of the cylindrical valve element (7) and the stopper element (24) is provided with a spiral seat portion (11) a spiral surface of which is brought into press-contact with the compression coil spring (10) to support the compression coil spring (10).

In the check valve having the above construction, preferably each of the cylindrical valve element (7) and the stopper element (24) is provided with the spiral seat portion (11).

Further, preferably the spiral seat portion (11) of each of the cylindrical valve element (7) and the stopper element (24) is integrally formed with each of the cylindrical valve element (7) and the stopper element (24).

Still further, preferably the spiral seat portion (11) of each of the cylindrical valve element (7) and the stopper element (24) is separated in construction from each of the cylindrical valve element (7) and the stopper element (24) to form a separate element.

Preferably, the spiral surface of the spiral seat portion (11) of each of the cylindrical valve element (7) and the stopper element (24) is brought into press-contact with one of opposite turns of the compression coil spring (10).

Further, preferably the spiral surface of the spiral seat portion (11) of each of the cylindrical valve element (7) and the stopper element (24) assumes a concave shape in cross section.

Still further, preferably the spiral surface of the spiral seat portion (11) of each of the cylindrical valve element (7) and the stopper element (24) assumes a semi-circular groove-like shape in cross section.

Preferably, an O-ring (8) is mounted in an innermost portion of one (1) of the body elements (1, 4) and brought into press-contact with a head portion of the cylindrical valve element (7) when the cylindrical valve element (7) is in its closed position to prevent the fluid from passing through an area between the O-ring (8) and the head portion of the cylindrical valve element (7).

Further, preferably the head portion of the cylindrical valve element (7) has its peripheral surface curved to form a curved peripheral surface portion which is brought into press-contact with the O-ring (8) when the cylindrical valve element (7) is in its closed position to prevent the fluid from passing through the area between the O-ring (8) and the head portion of the cylindrical valve element (7).

Preferably: the body elements (1, 4) comprise an upstream-side body element (1) and a downstream-side body element (4) a portion of which is threadably mounted in the upstream-side body element (1); and, the downstream-side body element (4) comprises the stopper element (24).

Further, preferably the tubular element of the compression coil spring (8) is made of fluororesins.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
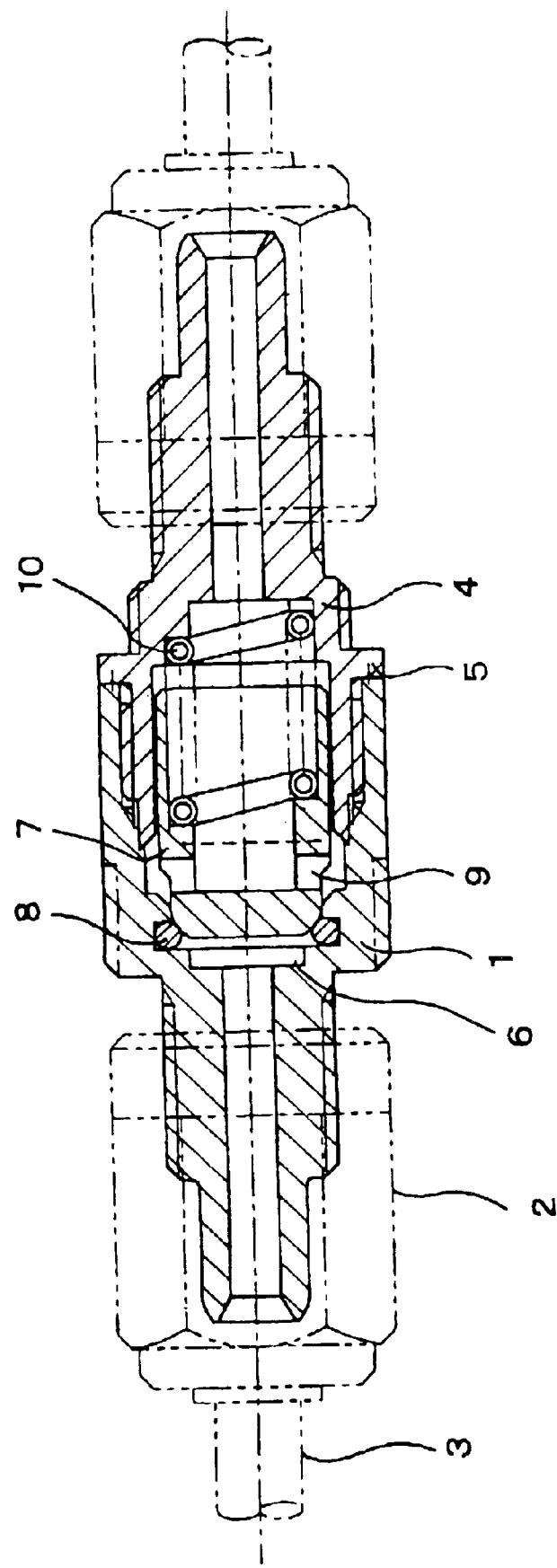
FIG. 1 is a longitudinal sectional view of an embodiment of the check valve of the present invention.

As shown in FIG. 1, an embodiment of a check valve of the present invention is provided with an upstream-side cylindrical body element 1 and a downstream-side cylindrical body element 4.

The upstream-side cylindrical body element 1 is fluid-tightly connected with an upstream-side fluid conduit 3 through an upstream-side nut member 2. On the other hand, the downstream-side cylindrical body element 4 has its upstream-side projection portion threadably engaged with a downstream-side bore portion of the upstream-side cylindrical body element 1, so that, as viewed from FIG. 1, a left-hand axial end surface of a flange portion 5 of the downstream-side cylindrical body element 4 abuts against a right-hand axial end surface of the downstream-side portion of the upstream-side cylindrical body element 1 and is welded thereto by ultrasonic welding, whereby the upstream-side cylindrical body element 1 is fluid-tightly connected with the downstream-side cylindrical body element 4.

As is clear from FIG. 1, an O-ring 8 is fixedly mounted in an annular groove formed in an inner peripheral wall of a bore portion of the upstream-side cylindrical body element 1, and brought into press-contact with an outer peripheral surface of a head portion of a cylindrical valve element 7 when the check valve is in its closed configuration.

In operation, in order to facilitate flow of the fluid passing through the check valve when the check valve is opened and also to ensure that the outer peripheral surface of the head portion of the cylindrical valve element 7 is evenly brought into press-contact with the O-ring 8, preferably the outer peripheral surface of the head portion of the cylindrical valve element 7 is curved. As is clear from FIG. 1, the head portion of the cylindrical valve element 7 is provided with a pair of diametrically opposed radial inlet openings 9 in its outer peripheral wall, through each of which openings 9 the fluid enters the interior of the cylindrical valve element 7.

A biasing device such as a compression coil spring 10 is axially interposed between the cylindrical valve element 7 and the downstream-side cylindrical body element 4. The compression coil spring 10 is constructed of a metal filament coated with a tubular element made of fluororesins.

Figure 3:
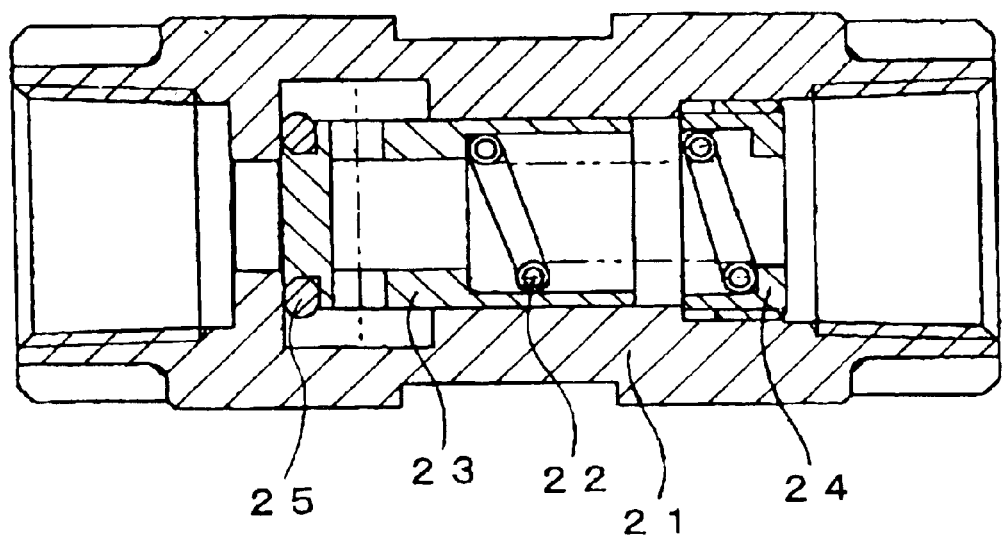
FIG. 3 is a longitudinal sectional view of a conventional check valve.

Each of the cylindrical valve element 7 and the downstream-side cylindrical body element 4 is provided with an inner spiral shoulder portion in its innermost portion to support each of opposite turns of the compression coil spring 10. More specifically, such inner spiral shoulder portion of the downstream-side cylindrical body element 4 serves as a stopper element 24 of a conventional check valve shown in FIG. 3. Due to this, for convenience in description, the inner spiral shoulder portion of the downstream-side cylindrical body element 4 is hereinafter also referred to as the stopper element 24.

The inner shoulder portion of each of the cylindrical valve element 7 and the downstream-side cylindrical body element 4 forms a spiral seat portion 11 provided with a spiral axial surface. Such spiral axial surface of the seat portion 11 of each of the cylindrical valve element 7 and the downstream-side cylindrical body element 4 is capable of being evenly brought into press-contact with each of opposite turns of the compression coil spring 10. As viewed from FIG. 2, the spiral seat portion 11 of the cylindrical valve element 7 has its left-hand axial surface 11a formed into a flat surface extending in a vertical plane perpendicular to the longitudinal axis of the cylindrical valve element 7, and brought into press-contact with the innermost axial surface of the cylindrical valve element 7. In the embodiment shown in FIG. 1, the spiral seat portion 11 is shown as if it were integrally formed with the cylindrical valve element 7. On the other hand, a right-hand inner axial surface of the cylindrical valve element 7 is formed into a spiral shape to serve as a spring seat 12. This spring seat 12 of the cylindrical valve element 7 is capable of receiving approximately one terminal turn of the compression coil spring 10, and assumes, for example, a semi-circular concave shape in cross section to receive therein a left-hand half of the cross sectional area of the metal filament of the compression coil spring 10.

Figure 2:
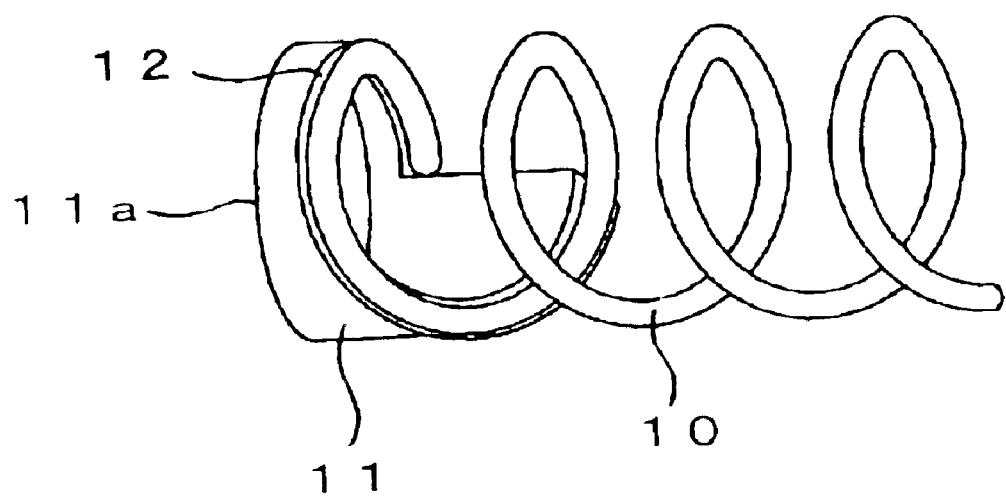
FIG. 2 is a perspective view of a spiral seat portion of each of the cylindrical valve element and the stopper element for supporting the biasing device such as a compression coil spring employed in the check valve of the present invention shown in FIG. 1.

The spiral seat portion 11 of each of the cylindrical valve element 7 and the downstream-side cylindrical body element 4 shown in FIG. 2 maybe separated from each of the cylindrical valve element 7 and the downstream-side cylindrical body element 4 to form a separate element. Such separate element may be fixedly mounted in (or integrally formed with) an innermost portion of each of the cylindrical valve element 7 and the downstream-side cylindrical body element 4 to serve as the spiral seat portion 11 of each of the cylindrical valve element 7 and the downstream-side cylindrical body element 4.

Since the check valve of the present invention has the above construction, it is possible for the biasing device such as the compression coil spring 10 to have its resilient force directly exerted on the spring seat portion 11 of each of the cylindrical valve element 7 and the downstream-side cylindrical body element 4 in the longitudinal direction of the check valve. More specifically, as viewed from FIG. 2, the compression coil spring 10 has its leftmost turn entirely brought into press-contact with the right-hand axial spiral surface of the spring seat portion 11 of the cylindrical valve element 7, and is therefore capable of directly applying its resilient force to the spring seat portion 11 of the cylindrical valve element 7 in the longitudinal direction of the check valve. As for the rightmost turn of the compression coil spring 10 shown in FIG. 2, such rightmost turn of the compression coil spring 10 is entirely brought into press-contact with the left-hand inner axial spiral surface of the downstream-side cylindrical body element 4, as viewed from FIG. 1. Due to the above construction, the check valve of the present invention is free from a fear that the longitudinal axis of the cylindrical valve element 7 is inclined inside the axial bore of the downstream-side cylindrical body element 4 under the influence of the axial resilient force exerted by the compression coil spring 10. Since the cylindrical valve element 7 is prevented from inclining inside the axial bore of the downstream-side cylindrical body element 4 as described above, the check valve of the present invention is free from a fear that the fluid leaks from the area of the O-ring 8 of the check valve in its closed configuration. Due to this, the check valve of the present invention is substantially free from any vibration and noise problem caused by such inclination of the longitudinal axis of the cylindrical valve element 7 inside the downstream-side cylindrical body element 4.

Further, in the check valve of the present invention, as is clear from FIG. 1, the O-ring 8 is not mounted on the outer peripheral surface of the head portion of the cylindrical valve element 7, but is fitted in the annular groove formed in an inner peripheral wall of the innermost portion of the upstream-side cylindrical body element 1. Due to this construction, there is no fear that the O-ring 8 drops out of the annular groove formed in the, inner peripheral wall of the upstream-side cylindrical body element 1 when the cylindrical valve element 7 is axially moved relative to the upstream-side cylindrical body element 1 in valve-opening operation.

The effects of the present invention will be now described. Since the check valve of the present invention has the above construction, the compression coil spring 10 is capable of exerting its resilient force evenly on the cylindrical valve element 7 in the longitudinal direction of the valve element 7 without fail. Due to this, in the check valve of the present invention, there is no fear that the fluid leaks from the area of the O-ring 8 when the cylindrical valve element 7 is in its closed position. This makes it possible to prevent the check valve of the present invention from vibrating and therefore from issuing any noise in operation. Due to this, the check valve of the present invention is capable of functioning properly for a long period of its service time without fail and without any cumbersome maintenance service.

What is claimed is:

1. A check valve comprising: a pair of body elements (1, 4) through which a fluid passes; a cylindrical valve element (7), which is slidably engaged inside one (1) of said pair of body element (1, 4), constantly subjected to a fluid pressure and biased toward its closed position under the influence of a resilient force exerted by a compression coil spring (10) having a diameter substantially equal to an inside diameter of a recess within the cylindrical valve element in which the compress on coil spring is engaged, said compression coil spring coated with a tubular element; and, a stopper element (24) disposed inside another one (4) of said pair of body elements (1, 4), wherein at least one of said cylindrical valve element (7) or said stopper element (24) is provided with a spiral seat portion (11) having a spiral surface which is brought into press-contact with a terminal turn of said compression coil spring (10) to support said compression coil spring (10) in said cylindrical valve element (7), and wherein said compression coil spring (10) is constrained to move within said pair of body elements only in the direction of the longitudinal axis of the check valve without fear of buckling.

2. The check valve as set forth in claim 1, wherein each of said cylindrical valve element (7) and said stopper element (24) is provided with said spiral seat portion (11).

3. The check valve as set forth in claim 1, wherein said spiral seat portion (11) is integrally formed with each of said cylindrical valve element (7) and said stopper element (24).

4. The check valve as set forth in claim 1, wherein said spiral seat portion (11) of each of said cylindrical valve element (7) and said stopper element (24) is separate in construction from each of said cylindrical valve element (7) and said stopper element (24) so as to form a separate element.

5. The check valve as set forth in claim 1, wherein said spiral surface of said spiral seat portion (11) of each of said cylindrical valve element (7) and said stopper element (24) is brought into press-contact with one of opposite terminal turns of said compression coil spring (10).

6. The check valve a set forth in claim 5, wherein said spiral surface of said spiral seat portion (11) of each of said cylindrical valve element (7) and said stopper element (24) has a concave recess all of which is respectively engaged against each of said opposite terminal turns and faces in the direction of the longitudinal axis of the check valve.

7. The check valve as set forth in claim 6, wherein said recess of said spiral surface of said spiral seat portion (11) of each of said cylindrical valve element (7) and said stopper element (24) has a semi-circular concave shape in cross section.

8. The check valve as set forth in claim 1, wherein an O-ring (8) is mounted in an innermost portion of the one (1) of said body elements (1, 4), said O-ring (8) brought into press-contact with a head portion of said cylindrical valve element (7) when said cylindrical valve element (7) is in a close position to prevent the fluid from passing through an area between said O-ring (8) and said head portion of said cylindrical valve element (7).

9. The check valve a set forth in claim 8, wherein said head portion of said cylindrical valve element (7) has its outer peripheral surface curved to form a curved outer peripheral surface portion which is brought into press-contact with said O-ring (8) when said cylindrical valve element (7) is in the closed position to prevent the fluid from passing through said area between said O-ring (8) and said head portion of said cylindrical valve element (7).

10. The check valve as set forth in claim 1, wherein: said body elements (1, 4) comprise an upstream-side body element (1) and a downstream-side body element (4) a portion of which is threadably mounted in said upstream-side body element (1); and, said downstream-side body element (4) comprises said stopper element (24).

11. The check valve as set forth in claim 1, wherein: said tubular element of said compression coil spring (8) is made of fluororesins.

12. A check valve comprising: a pair of body elements (1, 4) threadingly engaged together and through which a fluid passes; a cylindrical valve element (7), which is slidably engaged inside one (1) of said pair of body elements (1, 4), constantly subjected to a fluid pressure an biased toward its closed position under the influence of a resilient force exerted by a compression coil spring (10), said compression coil spring coated with a tubular element; and, a stopper element (24) disposed inside another one (4) of said pair of body elements (1, 4), wherein at least one of said cylindrical valve element (7) or said stopper element (24) is provided with a spiral seat portion (11) having a spiral surface facing in the direction of the longitudinal axis of the check valve, said spiral surface engaging a terminal turn of said compression coil spring (10) to support said compression coil spring (10) in said cylindrical valve element (7), and wherein said compression coil spring (10) said constrained to move within said pair of body elements in the direction of the longitudinal axis of the check valve without fear of buckling.

13. The check valve as set forth in claim 12, wherein each of said cylindrical valve element (7) and said stopper element (24) is provided with said spiral seat portion (11).

14. The check valve as set forth in claim 12, wherein said spiral seat portion (11) is integrally formed with each of said cylindrical valve element (7) and said stopper element (24).

15. The check valve as set forth in claim 13, wherein said spiral seat portion (11) of each of said cylindrical valve element (7) and said stopper element (24) is separate in construction from each of said cylindrical valve element (7) and said stopper element (24) so as to from a separate element.

16. The check valve as set forth in claim 12, wherein said spiral surface of said spiral seat portion (11) of each of said cylindrical valve element (7) and said stopper element (24) is brought into press-contact with one of opposite terminal turns of said compression coil spring (10).

17. The check valve as set forth in claim 16, wherein said spiral surface of said spiral seat portion (11) of each of said cylindrical valve element (7) and said stopper element (24) has a concave recess all of which is engaged against each of said opposite terminal turns.

18. The check valve as set forth in claim 17, wherein said recess of said spiral surface of said spiral seat portion (11) of each of said cylindrical valve element (7) and said stopper element (24) has a semi-circular concave shape in cross section.

19. The check valve as set forth in claim 12, wherein an O-ring (8) is mounted in an innermost portion of the one (1) of said body elements (1, 4), said O-ring (8) brought into press-contact with a head portion of said cylindrical valve element (7) when said cylindrical valve element (7) is in a closed position to prevent the fluid from passing through an area between said O-ring (8) and said head portion of said cylindrical valve element (7).

20. The check valve as set forth in claim 19, wherein said head portion of said cylindrical valve element (7) has its outer peripheral surface curved to form a curved outer peripheral surface portion which is brought into press-contact with said O-ring (8) when said cylindrical valve element (7) is in the closed position to prevent the fluid from passing through said area between said O-ring (8) and said head portion of said cylindrical valve element (7).

* * * * *